Sept. 1, 1959
C. T. WALLIS
2,901,761
WINDSHIELD WIPER BLADE ASSEMBLY
Filed March 23, 1955
2 Sheets-Sheet 1
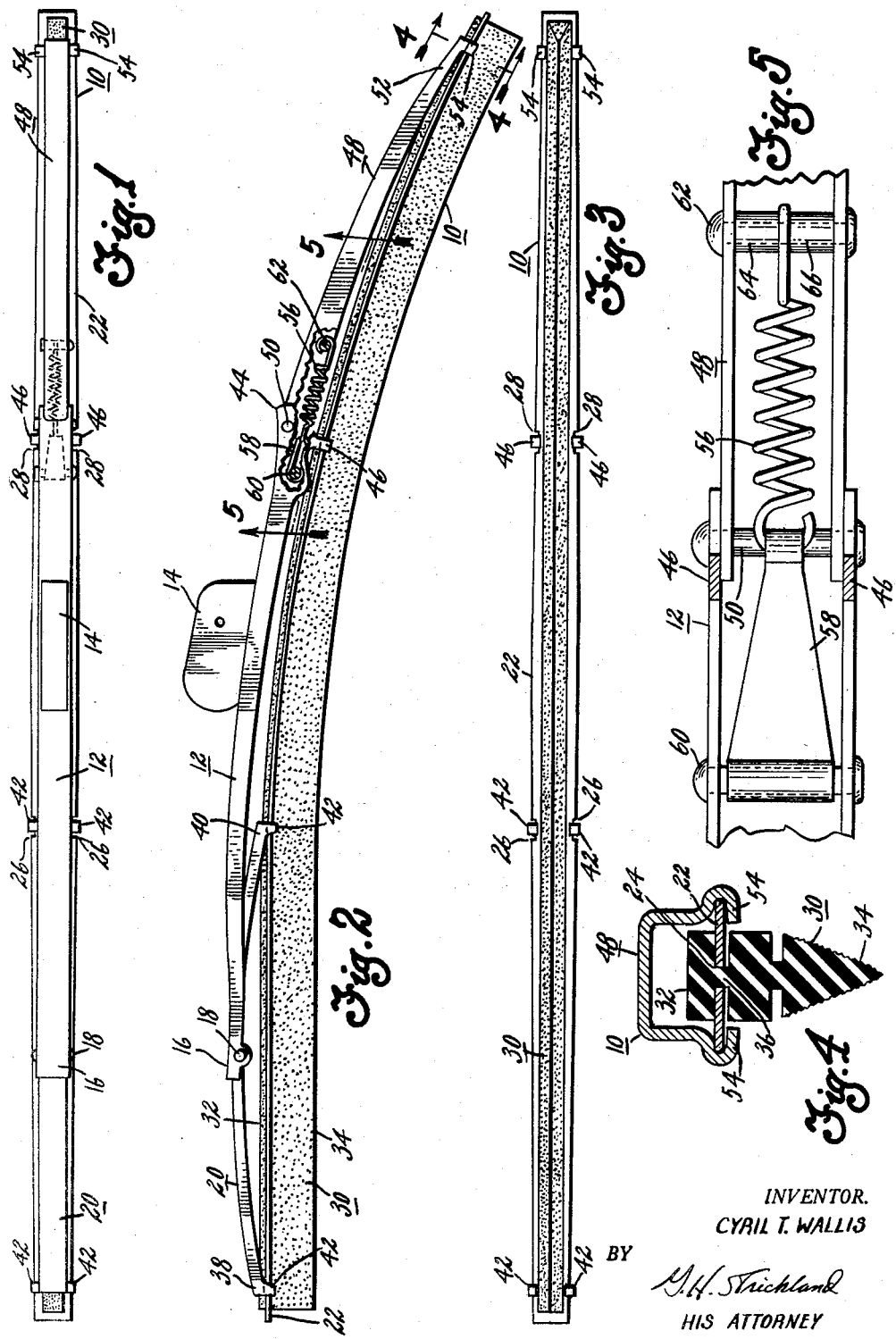
INVENTOR.
CYRIL T. WALLIS
BY
*G.H. Strickland*
HIS ATTORNEY Sept. 1, 1959  C. T. WALLIS  2,901,761
WINDSHIELD WIPER BLADE ASSEMBLY
Filed March 23, 1955  2 Sheets-Sheet 2
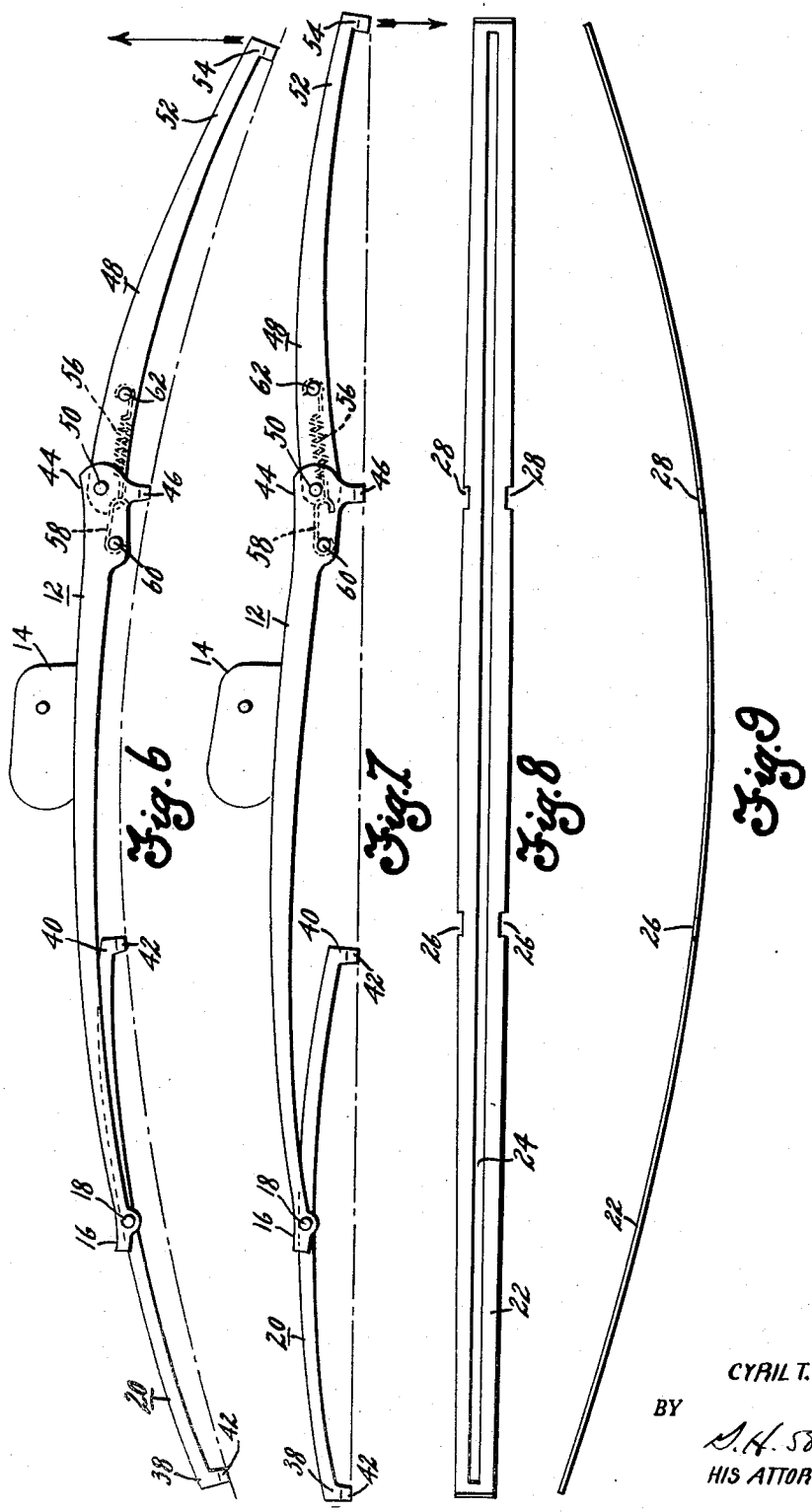
INVENTOR.
CYRIL T. WALLIS
BY
*J. H. Strickland*
HIS ATTORNEY United States Patent Office 2,901,761
Patented Sept. 1, 1959

2,901,761

WINDSHIELD WIPER BLADE ASSEMBLY

Cyril T. Wallis, Brockport, N.Y., assignor to General Motors Corporation, Detroit, Mich., a corporation of Delaware Application March 23, 1955, Serial No. 496,132

12 Claims. (Cl. 15—245)

This invention pertains to windshield wipers, and particularly to an improved wiper blade assembly for cleaning curved, as well as substantially planar, surfaces.

Heretofore, it has been proposed to construct a wiper blade assembly including a flexible backing strip carried squeegee; a holder connected to an intermediate point of the backing strip; a yoke pivotally connected to the inner end of the holder, opposite ends of the yoke being connected to the backing strip at longitudinally spaced points; an arm pivotally connected to the outer end of the holder and movably connected to the backing strip adjacent the outer end thereof; and resilient means inter-connecting the holder and the arm for normally deforming the squeegee and backing strip. Wiper blade assemblies of this general type are disclosed in my copending application Serial No. 428,565, filed May 10, 1954, now Patent No. 2,814,821, and application Serial No. 428,561, filed May 10, 1954, now Patent No. 2,859,466, in the name of Sanden et al. The present invention relates to an improved wiper blade assembly of the aforesaid type. Accordingly, among my objects are the provision of a wiper blade assembly for effectively cleaning substantial portions of a wrap-around windshield; the further provision of a wiper blade assembly adapted to clean curved, as well as substantially planar, surfaces including means for applying original deforming pressure to the outer end of the blade; and the still further provision of a wiper blade assembly including spring biased means operable to normally deform the wiping element, or squeegee unit, to form a curved wiping edge.

The aforementioned and other objects are accomplished in the present invention by incorporating a spring biased, cantilever arm, which is pivotally connected to a primary pressure distributing member and movably connected to a squeegee unit adjacent the outer end thereof, for normally deforming the squeegee unit to form a curvilinear wiping edge. Specifically, the blade assembly includes a holder, or primary pressure distributing member, having arm attaching means of the type disclosed in my copending application Serial No. 490,085, filed February 23, 1955. The outer end of the holder is movably connected to a flexible backing strip, which carries an elongate elastomeric wiping element, or squeegee. The inner end of the primary pressure distributing member is pivotally connected to an intermediate point of a secondary pressure distributing member, or yoke, having its opposite ends connected to the backing strip at longitudinally spaced points. The outer end of the holder is also pivotally connected to a cantilever arm, the free end of which is movably connected to the flexible backing strip adjacent the outer end thereof. In addition, the holder and the cantilever arm are interconnected by resilient means for applying original deforming pressure to the cantilever arm and the outer end portion of the squeegee unit, so as to normally deform the squeegee unit and form a curvilinear wiping edge.

The flexible backing strip and the rubber-like wiping element are of conventional design in so far as the manner in which the wiping element is supported by the backing strip. Moreover, the backing strip is freely flexible in a plane substantially perpendicular to the surface to be wiped and substantially rigid in a plane transverse thereto, i.e. parallel to the surface to be wiped. The wiping element is freely tiltable relative to the backing strip, which may comprise a sheet metal strip having a longitudinally extending slot therein with closed ends. In order to increase the flexibility of the backing strip adjacent the inner and outer ends of the squeegee unit, the backing strip is of varying width, gradually tapering from the middle towards each end.

One end of the spring interconnecting the holder and the cantilever arm is connected to a hook, which is pivotally supported by the holder. The other end of the spring is connected to a pin carried by the cantilever arm, the spring being centered between a pair of plastic rings. The outer end of the cantilever arm is freely slidable on the flexible backing strip. The connection between the holder and the backing strip also permits limited movement therebetween. Likewise, one end of the secondary pressure applying member is movably connected to the backing strip while the other end thereof cannot move longitudinally relative to the backing strip and functions to prevent separation of the squeegee unit and the pressure applying lever system.

Further objects and advantages of the present invention will be apparent from the following description, reference being had to the accompanying drawing wherein a preferred embodiment of the present invention is clearly shown.

In the drawing:

Fig. 1 is a top view of a wiper blade constructed according to this invention.

Fig. 2 is a side view, in elevation, with certain parts broken away depicting the windshield wiper blade assembly of this invention.

Fig. 3 is a bottom view, in elevation, of the wiper blade assembly.

Fig. 4 is an enlarged fragmentary sectional view taken along line 4—4 of Fig. 2.

Fig. 5 is an enlarged sectional view taken along line 5—5 of Fig. 2.

Fig. 6 is an elevational view of the pressure distributing frame in the curved condition.

Fig. 7 is a view similar to Fig. 6 in the flat condition.

Fig. 8 is a top view of the backing strip as originally curved.

Fig. 9 is a side view of the backing strip as originally curved.

With particular reference to Figs. 1 through 3, the improved wiper blade assembly is generally depicted by the numeral 10 and includes a primary arm-pressure distributing member, or channeled holder, 12 having an arm attaching socket 14 connected thereto. The arm attaching socket is of the type disclosed in my aforementioned application, Serial No. 490,085, and, per se, constitutes no part of this invention, it being understood that a wiper arm, not shown, connected to the socket 14 applies wiping pressure to the blade assembly 10. The inner end 16 of the channeled holder 12 is bent upwardly, as indicated in Fig. 2, and carries a transversely extending pin 18 to which the intermediate portion of a secondary pressure applying member, or yoke, 20 is pivotally connected.

The wiper blade assembly includes a squeegee unit comprising a metallic backing strip 22 and an elongate flexible wiping element 30. As seen particularly in Figs. 8 and 9, the backing strip 22 comprises a one-piece stamping in the form of a flat metal strip having a longitudinal neck receiving slot 24, which terminates short of each end of the strip. The backing strip 22 is freely flexible in a plane perpendicular to the surface to be wiped and substantially inflexible in a plane at right angles thereto. Initially, the backing strip is formed into a curve opposite to that of the windshield surface to be wiped, as depicted in Fig. 9, in order to assure its conformance with either a flat or a curved surface. By initially reversely curving the backing strip, when it is pressed against a flat surface, the center thereof will contact first and as pressure is applied, the strip will progressively contact the flat surface from the center toward each end.

In order to increase the flexibility of the backing strip at opposite ends thereof, so that the backing strip is not uniformly flexible in a plane perpendicular to the surface to be wiped, but, on the other hand, has greater flexibility on the ends than in the middle, the strip 22 is of varying width, as depicted in Fig. 8, gradually tapering from the middle towards each end thereof. The backing strip is also formed with notches, or recesses, 26 and 28, the purpose of which will be described hereinafter.

The squeegee unit also includes a freely flexible, elastomeric wiping element, or squeegee, 30 having retention portion 32 and a wiping edge portion 34. The retention portion 32 and the wiping portion 34 are interconnected by a reduced neck 36, the flexible backing strip being disposed in the groove between the wiping portion and the retention portion, as depicted in Fig. 4. Thus, the squeegee 30 is freely tiltable relative to the backing strip, while being restrained against longitudinal movement relative thereto by the closed ends of the slot 24.

Opposite ends 38 and 40 of the secondary pressure distributing member 20 are movably connected at spaced points to the flexible backing strip 22 in the manner depicted in Fig. 3. That is, each end of the member 20 is formed with inwardly extending ear portions 42, which are clamped about the flexible backing strip 22, the ears of end 40 being disposed within the notches 26 so as to prevent longitudinal separation between the squeegee unit and the pressure applying lever system. That is, while end 40 of the member 20 is movably connected to the backing strip 22, it cannot slide longitudinally relative thereto. However, end 38 can slide longitudinally relative to the backing strip 22. The upturned end 16 of the holder 12 constitutes a weather shield for the pivotal connection between the yoke 20 and the holder 12.

The outer end 44 of the holder 12 is also upturned, as indicated in Fig. 2. Moreover, this end 44 includes ear portions 46, which are clamped about the backing strip 22 in the manner indicated in Fig. 4 so that the backing strip 22 is slidable relative thereto. The backing strip notches 28 limit sliding movement between the holder 12 and the backing strip 22. A cantilever arm 48, or deforming pressure applying and arm-pressure distributing member, is pivotally connected to the end 44 of the holder 12 by a pin 50, as indicated in Figs. 2 and 5. The upturned end 44, likewise, constitutes a weather shield for this pivotal connection. Both the yoke 20 and the arm 48 are of channeled cross section, and the outer end 52 of the arm 48 is slidably connected to the backing strip 22 adjacent the outer end thereof, the outer end 52 having ears 54, which are clamped about the backing strip and freely slidable relative thereto.

In the wiper blade assembly depicted in Fig. 2, all of the pressure applied to the squeegee unit when it engages a windshield is derived from the wiper arm, not shown, through the connector 14 and distributed by the lever system including holder 12, yoke 20, and lever 48. This pressure is properly apportioned at points 38, 40, 46 and 54 to bend the backing strip from its reverse bend, as depicted in Fig. 9, to that required by the greatest curvature on the surface to be wiped. The pressure applied at points 38, 40 and 46 is proportioned by the members 12 and 20. The pressure applied at point 54 is controlled by a coil spring 56.

The spring 56 has its inner end connected to a link 58, the link 58 being pivotally supported by a pin 60 carried by the holder 12. The pin 60 is displaced longitudinally and below the pin 50 to assist in originally deforming the backing strip 22 from the reverse curve of Fig. 9 to the curvature depicted in Fig. 2. The other end of the spring 56 is hooked around a pin 62 carried by the arm 48, this end of the spring being centered within the arm 48 by a pair of plastic rings 64 and 66 mounted on the pin 62, as depicted in Fig. 5.

When the blade engages a substantially flat surface, the deforming force of spring 56 increases due to lengthening thereof and thereby automatically compensates for flattening of the backing strip.

With reference to Figs. 6 and 7, the pressure distributing frame or lever system is shown in a curved condition and in a flat condition. In the flat condition of Fig. 7, the pressure at point 54, applied by spring 56, is only about half of that in the curved condition. The higher pressure at point 54 under curved conditions is necessary in order to properly bend the backing strip 22 against its reverse curve so as to make it conform to the curvature of the windshield. When the squeegee unit, including the backing strip 22 and the flexible wiping body 30 are assembled in the frame of Figs. 6 and 7, the pressure at point 54 is substantially the same whether the blade is in a flat or a curved condition.

From the aforegoing, it is readily apparent that the improved wiper blade assembly will readily conform to surfaces of greater curvature than conventional blade assemblies by reason of the application of original deforming pressure to the outer end portion of the blade squeegee unit. Moreover, the improved pressure applying lever system of the present invention results in substantially uniform distribution of arm applied pressure to the blade.

While the embodiment of the present invention as herein disclosed, constitutes a preferred form, it is to be understood that other forms might be adopted.

What is claimed is as follows:

1. A windshield wiper blade comprising, an elongate flexible body having a wiping edge, a flexible backing therefor having a gradually tapering cross-sectional area from its medial portion towards each end with the largest cross-sectional area in said medial portion and the smallest cross-sectional area adjacent said ends, an arm-pressure distributing member extending lengthwise of the body, a second member extending lengthwise of the body beneath one end of the first member and pivotally connected thereto for distributing the arm pressure as transmitted to it by said one end, opposite ends of the second member being connected to the backing at longitudinally spaced points, said first member having its opposite end directly and movably connected to said backing, a third member extending lengthwise of the body and pivotally connected at one end to the opposite end of said first member, the other end of said third member being movably connected to said backing adjacent the outer end thereof, the portions of the backing beneath said second and said third members being of greater flexibility than the portion of the backing between the inner end of the second member and said one end of the third member, and resilient means interconnecting said first and third members to normally deform the backing and the flexible body into a curvilinear shape.

2. A windshield wiper blade comprising, an elongate flexible body, a flexible backing therefor having a gradually tapering cross-sectional area from its medial portion towards each end with the largest cross-sectional area in said medial portion and the smallest cross-sectional area adjacent said ends, a pressure distributing member extending lengthwise of the body and having one end directly and movably connected to the backing and its other end indirectly connected thereto through a second pressure distributing member which is pivotally connected intermediate its ends to the other end of the first pressure distributing member and, in turn, has its opposite ends connected to the backing at longitudinally spaced points, and a third pressure distributing member pivotally connected to said first pressure distributing member at said one end thereof and movably connected to the backing adjacent an end thereof, the portions of the backing beneath said second and said third members being of greater flexibility than the portion of the backing between the inner end of the second member and said one end of the third member, and resilient means interconnecting said first and third members to normally deform the backing and the flexible body.

3. A windshield wiper blade comprising, an elongate flexible body having a wiping edge, a flexible backing therefor having a gradually tapering cross-sectional area from its medial portion towards one end thereof with the largest cross-sectional area in said medial portion and the smallest cross-sectional area adjacent said one end whereby the one end portion has greater flexibility than in the medial portion thereof in a plane normal to the surface to be wiped, an arm-pressure distributing member of channel shape extending lengthwise of the body, a second member extending lengthwise of the body and pivotally connected to one end of the first member for distributing the arm pressure as transmitted to it by said one end, opposite ends of the second member being connected to the backing at longitudinally spaced points, said first member having its opposite end directly and movably connected to said backing, a third member of channel shape extending lengthwise of the body and pivotally connected at one end to the opposite end of said first member, the other end of said third member being movably connected to said backing adjacent the outer end thereof, said end portion of said backing of greater flexibility being disposed beneath said third member and resilient means disposed within the channel shaped portions of said first and third members and interconnecting said first and third members to normally deform the backing and the flexible body into a curvilinear shape.

4. A windshield wiper blade comprising, an elongate flexible body having a wiping edge, a flexible backing therefor having a gradually tapering cross-sectional area from its medial portion towards each end with the largest cross-sectional area in said medial portion and the smallest cross-sectional area adjacent said ends whereby said backing has greater flexibility at both end portions thereof than in the medial portion therebetween in a plane normal to the surface to be wiped, an arm-pressure distributing member of channel shape extending lengthwise of the body, a second member extending lengthwise of the body beneath one end of the first member and pivotally connected thereto for distributing the arm pressure as transmitted to it by said one end, opposite ends of the second member being connected to the backing at longitudinally spaced points, said first member having its opposite end directly and movably connected to said backing, a third member of channel shape extending lengthwise of the body and pivotally connected at one end to the opposite end of said first member, the other end of said third member being movably connected to said backing adjacent the outer end thereof, the end portions of said backing of greater flexibility being disposed beneath said first and said third members, and resilient means disposed within the channel shaped portions of said first and third members and interconnecting said first and third members to normally deform the backing and the flexible body into a curvilinear shape.

5. A windshield wiper blade comprising, an elongate flexible body having a wiping edge, a flexible backing strip therefor having a gradually tapering cross-sectional area from the medial portion towards each end with the largest cross-sectional area in said medial portion and the smallest cross-sectional area adjacent said ends, an arm-pressure distributing member of channel shape extending lengthwise of the body, a second member extending lengthwise of the body beneath one end of the first member and pivotally connected thereto for distributing the arm pressure as transmitted to it by said one end, opposite ends of the second member being connected to the backing strip at longitudinally spaced points, said first member having its opposite end directly and movably connected to said backing strip, a third member of channel shape extending lengthwise of the body and pivotally connected at one end to the opposite end of said first member, the other end of said third member being movably connected to said backing strip adjacent the outer end thereof, and a spring disposed within the channel shaped portions of said first and third members and having one end operatively connected to a pin carried by said first member and its opposite end operatively connected to said third member to normally deform the body into a curvilinear shape.

6. The wiper blade set forth in claim 5 wherein said pin is displaced from the pivotal connection between said first and third members so as to assist in the deformation of the outer portion of said backing strip and flexible body.

7. The wiper blade set forth in claim 5 wherein said pin is located closer to the backing strip than the pivotal connection between said first and third members.

8. The wiper blade set forth in claim 5 wherein said pivot pin is displaced longitudinally away from the pivotal connection between said first and third members.

9. The wiper blade set forth in claim 5 wherein said pivot pin is located closer to the backing strip and displaced longitudinally away from the pivotal connection between said first and third members.

10. The wiper blade set forth in claim 5 wherein the opposite end of said spring is connected to a pivot pin carried by said third member.

11. The wiper blade set forth in claim 10 wherein the opposite end of said spring is centered on said pivot pin between a pair of rings.

12. In a windshield wiper blade assembly, arm-pressure distributing means for an elongate and flexible squeegee unit having progressively greater flexibility from its medial portion towards each end, comprising, an arm connected primary pressure distributing member of channel shape, a second pressure distributing member pivotally connected intermediate its ends to one end of said first member, opposite ends of said second member being movably connected at longitudinally spaced points to said squeegee unit, a third pressure applying member of channel shape pivotally connected to the other end of said first member and movably connected to said flexible squeegee unit adjacent the outer end thereof, and resilient means disposed within the channel shaped portions of said first and third members and interconnecting said first and third members for normally deforming said squeegee unit, said first member being directly and movably connected to an intermediate point of said squeegee unit.

References Cited in the file of this patent

UNITED STATES PATENTS

| | | |
|---|---|---|
| 2,589,339 | Carson | Mar. 18, 1952 |
| 2,691,790 | O'Shei | Oct. 19, 1954 |
| 2,697,241 | Oishei | Dec. 21, 1954 |
| 2,706,291 | Rappl | Apr. 12, 1955 |
| 2,782,445 | Krohm | Feb. 26, 1957 |

FOREIGN PATENTS

| | | |
|---|---|---|
| 619,320 | Great Britain | Mar. 8, 1949 |